(12) United States Patent
Georgescu et al.

(10) Patent No.: US 10,180,996 B2
(45) Date of Patent: Jan. 15, 2019

(54) MULTI-COMPONENT COMPUTATIONAL FLUID DYNAMICS SIMULATIONS

(71) Applicant: Fujitsu Limited, Kanagawa (JP)

(72) Inventors: Serban Georgescu, London (GB); Brent Walker, Ealing (GB); Peter Chow, Kent (GB); Tetsuyuki Kubota, Acton (GB)

(73) Assignee: FUJITSU LIMITED, Kawasaki (JP)

( * ) Notice: Subject to any disclaimer, the term of this patent is extended or adjusted under 35 U.S.C. 154(b) by 849 days.

(21) Appl. No.: 14/219,568

(22) Filed: Mar. 19, 2014

(65) Prior Publication Data
US 2014/0297231 A1    Oct. 2, 2014

(30) Foreign Application Priority Data
Mar. 26, 2013   (EP) .................................. 13161198

(51) Int. Cl.
*G06F 17/50*    (2006.01)

(52) U.S. Cl.
CPC ...... *G06F 17/5009* (2013.01); *G06F 17/5018* (2013.01); *G06F 2217/16* (2013.01)

(58) Field of Classification Search
CPC ............. G06F 17/5009; G06F 17/5018; G06F 2217/16; G06T 19/00; G06T 17/00; G06T 15/00; G06T 1/00
See application file for complete search history.

(56) References Cited

U.S. PATENT DOCUMENTS

| 5,583,973 A | * | 12/1996 | DeLisi | G06T 17/00 345/420 |
| 5,991,526 A | * | 11/1999 | Igarashi | G06T 17/20 358/1.2 |

(Continued)

FOREIGN PATENT DOCUMENTS

| GB | 2474900 | 5/2011 |
| JP | 2010-230331 | 10/2010 |

(Continued)

OTHER PUBLICATIONS

Naveed Sherwani, Physical Design Automation, CRC Press LLC, 2003, adapted from Algorithms for VLSI Physical Design Automation, Boston: Kluwer Academic Publishers, 1993, 1-24.*

(Continued)

*Primary Examiner* — Aniss Chad
*Assistant Examiner* — Justin C Mikowski
(74) *Attorney, Agent, or Firm* — Staas & Halsey LLP

(57) ABSTRACT

A method of Computational Fluid Dynamics CFD simulation for a product including a plurality of individual components, the method comprising creating a library of known components, including their component geometry and modeling properties needed for simulation, the components being individually meshed within the library; using a graphical user interface GUI to select and place a plurality of components from the library in a desired configuration to make up a CFD model of a product; and CFD simulating the model by scheduling a plurality of solvers, each solver modeling a component group comprising part or all of at least one component, to manage the time of action of the solvers and data exchange between the solvers.

18 Claims, 11 Drawing Sheets

(56) References Cited

U.S. PATENT DOCUMENTS

| | | | | |
|---|---|---|---|---|
| 8,275,583 | B2* | 9/2012 | Devarajan | G06Q 10/04 703/1 |
| 8,599,197 | B1* | 12/2013 | Yu | G06T 17/20 345/419 |
| 2005/0071034 | A1* | 3/2005 | Mitrovic | G06F 17/5009 700/121 |
| 2005/0071035 | A1* | 3/2005 | Strang | G05B 19/41885 700/121 |
| 2005/0071039 | A1* | 3/2005 | Mitrovic | G06F 17/5018 700/121 |
| 2005/0114097 | A1* | 5/2005 | Duncan | G06F 17/5018 703/1 |
| 2006/0064288 | A1* | 3/2006 | Ferryanto | G06F 17/50 703/2 |
| 2008/0312880 | A1* | 12/2008 | McLuckie | G05B 17/02 703/1 |
| 2009/0326884 | A1* | 12/2009 | Amemiya | G06F 1/206 703/6 |
| 2010/0145668 | A1* | 6/2010 | Fisher | G06T 17/205 703/6 |
| 2011/0063291 | A1* | 3/2011 | Yuksel | G06T 17/20 345/420 |
| 2011/0066796 | A1* | 3/2011 | Eilert | G06F 3/06 711/105 |
| 2011/0161966 | A1* | 6/2011 | Tamiya | G06F 9/4881 718/102 |
| 2012/0022841 | A1* | 1/2012 | Appleyard | G06F 17/12 703/2 |
| 2012/0089382 | A1* | 4/2012 | Fisher | G06F 9/5083 703/13 |
| 2012/0296619 | A1* | 11/2012 | Maliassov | E21B 43/00 703/10 |
| 2013/0057550 | A1* | 3/2013 | Kishikawa | G01C 21/3638 345/420 |
| 2013/0116993 | A1* | 5/2013 | Maliassov | G01V 9/00 703/2 |
| 2013/0198426 | A1* | 8/2013 | Lopez Bueno | G06F 17/5018 710/107 |
| 2013/0218536 | A1* | 8/2013 | Yu | G06F 17/13 703/2 |
| 2015/0081267 | A1* | 3/2015 | Conroy | G06F 9/455 703/21 |
| 2015/0195091 | A1* | 7/2015 | Kubota | H04L 9/3234 713/191 |
| 2015/0242588 | A1* | 8/2015 | Audigier | G06F 19/3437 606/41 |
| 2016/0171134 | A1* | 6/2016 | Mirabella | G06F 17/30345 703/1 |
| 2016/0209850 | A1* | 7/2016 | Golubev | G05D 1/0825 |

FOREIGN PATENT DOCUMENTS

| | | |
|---|---|---|
| JP | 2011-508345 | 3/2011 |
| JP | 2011-508346 | 3/2011 |
| WO | 2009/085541 | 7/2009 |
| WO | 2009/085559 | 7/2009 |

OTHER PUBLICATIONS

Extended European Search Report dated Apr. 8, 2014 in corresponding European Patent Application No. 13161198.0.
"A Benchmark Study of Computational Fluid Dynamics Predictive Accuracy for Component-Printed Circuit Board Heat Transfer", Eveloy et al, IEEE Transactions on Components and Packaging Technologies, vol. 23, No. 3, Sep. 2000, pp. 568-577.
"An Integration Platform for Metacomputing Applications", Nguyen et al, ICCS 2002, LNCS 2329, 2002, pp. 474-483 Apr. 2002.
"GPU Accelerated CAE Using Open Solvers and the Cloud", Georgescu et al, ACM SIGARCH Computer Architecture News, vol. 39, No. 4, Sep. 2011, pp. 14-19.
"A Software Strategy Towards Putting Domain Decomposition at the Centre of a Mesh-Based Simulation Process", Chow et al, ICCS 2002, LNCS 2331, 2002, pp. 755-763 Apr. 2002.
Japanese Office Action dated Mar. 13, 2018 in corresponding Japanese Patent Application No. 2014-055201, 3 pages.
Japanese Office Action dated Dec. 19, 2017 in corresponding Japanese Patent Application No. 2014-055201.
European Search Report dated Aug. 2, 2013 in corresponding European Patent Application No. 13161198.0.
"Electronic Packaging and Reduction in Modelling Time Using Domain Decomposition", Chow (Fujitsu Laboratories of Europe Ltd, Physical and Life Sciences) and Lai (School of Computing and Mathematical Sciences, University of Greenwich), pp. 193-200.
"Numerical simulation of the flow around rows of cylinders", Huang et al., Science Direct, Computers & Fluids 35, 2006, pp. 485-491.
"Putting domain decomposition at the heart of a mesh-based simulation process", Chow and Addison, International Journal for Numerical Methods in Fluids, Revised Jun. 12, 2002, pp. 1471-1484.
"Collaborating components in mesh-based electronic packaging", Chow and Lai, Scientific Programming 12, 2004, pp. 65-70.

* cited by examiner

MULTI-COMPONENT COMPUTATIONAL FLUID DYNAMICS SIMULATIONS

CROSS-REFERENCE TO RELATED APPLICATIONS

This application claims the benefit of European Application No. 13161198.0, filed Mar. 26, 2013, in the European Intellectual Property Office, the disclosure of which is incorporated herein by reference.

BACKGROUND

1. Field

The present invention relates to computational fluid dynamics (CFD) simulation in multi-component systems. These types of simulations are a subset of Computed Aided Engineering (CAE), which is the use of computer software for the purpose of modeling and simulating the behaviour of products in order to improve their quality.

2. Description of the Related Art

CFD is a branch of fluid mechanics that uses iterative numerical methods and algorithms to solve and analyse problems that involve fluid flows. A solution may be a steady state or a transient state of fluid flow. CFD can also take heat flow into account, and thus act additionally as a heat analysis.

The invention particularly relates to the field of CFD simulations which involve a large number of models composed of a finite number of components. A typical application is CFD simulation of heat transfer inside servers, in which the model usually consists of one large component (Motherboard) and many smaller components (expansion cards, memory modules, CPUs, etc) and several configurations need to be simulated and analyzed.

CFD simulation has become a crucial step in the design of many industrial products. One typical case is the IT industry, where hardware manufacturers and system integrators use CFD to simulate the air flow and heat transfer inside notebooks, desktops, computers, servers and other devices. The results obtained from the CFD simulations are used to increase the quality and reliability of the products by optimizing the way the components are placed inside the case and making sure they are running at optimal temperature. On a larger scale, the same kind of simulation can be used for the many parts in an automobile or aircraft. CFD can also be used for simulation of data centres and rooms within data centres.

The flow of a traditional CFD simulation process is shown in FIG. 1. First, a CAD model of the system to be simulated is created or obtained in step S1. Before the simulation can be performed, the model has to undergo pre-processing, in which a mesh of the model is created in step S2 and then boundary conditions and material properties are set in step S3. In meshing, the geometry is partitioned (meshed) by a mesher into a very large number of elements, to form a mesh. The mesh, accompanied by the boundary conditions, is subsequently sent to a solver which uses standard numerical techniques, like the Finite Element Method, or, more usually, the Finite Volume Method to compute the effect (e.g. fluid behaviour and properties) of the boundary conditions on the system, using individual calculations for each element. For complex geometries with many components, the meshing stage is particularly difficult both from a computational point of view and because in many instances it involves manual work.

After the pre-processing stage has been completed, the CFD solver mentioned above is run in step S4 in a simulation/modelling stage which solves the numerical equations, generally using an iterative technique to obtain the results of the simulation. The process ends with a post-processing stage S5, in which the results are visualized and analyzed.

Embodiments of the invention aim to address the computing and/or user input time required to simulate complex CFD models, in particular for models that are a combination of a number of components.

SUMMARY

Additional aspects and/or advantages will be set forth in part in the description which follows and, in part, will be apparent from the description, or may be learned by practice of the invention.

According to an embodiment of an aspect of the invention there is provided a method of Computational Fluid Dynamics CFD simulation for a product including a plurality of individual components, the method comprising creating a library of known components, including their component geometry and modelling properties needed for simulation, the components being individually meshed within the library; using a Graphical User Interface GUI to select and place a plurality of components from the library in a desired configuration to make up a CFD model of a product; and CFD simulating the model. The CFD simulation may schedule a plurality of solvers, each solver modelling a component group comprising part or all of at least one component, to manage the time of action of the solvers and data exchange between the solvers.

This embodiment can take advantage of the multi-component form of a product at each stage of component meshing, selection of components to make up a CFD model of a product and CFD simulation of the model. The library of known components allows the components to be meshed once only and used within a range of products. The defined GUI allows a simple selection and juxtaposition of pre-meshed components to quickly make up a CFD model of a product without any requirement for knowledge of meshing requirements. The use of a plurality of solvers means that optimal use can be made of parallel computing architecture with a division of the model at least partially predefined by the individually meshed components, so that there is a further benefit from the earlier steps.

The first aspect of the invention relates to a whole system approach, but the skilled reader will appreciate that each stage of library creation, making a CFD model and simulating the CFD model using a multi-component approach is individually advantageous.

According to an embodiment of a further aspect of the invention there is provided a method of simplifying CFD pre-processing for a range of multi-component products, each product including a different combination of a plurality of components provided for the range, the method including for each of the components in the range in turn: inputting a Computer Aided Design CAD model of the component geometry; adding an air region around the component; creating a mesh including the component and its surrounding air region for use in CFD analysis; setting modelling properties for the component; and adding the component geometry, mesh and modelling properties as a known component to a component library individually storing known components for the range; wherein the component library allows selection and placing of the known components to create models of the products.

This aspect relates to storage in a library (for example embodied as a database) of a plurality of components for a range of multi-component products. Each product includes a different combination of components. For example, there may be different components and/or different numbers of components used and/or the position of the components may differ between products. A computer aided design model can be read into a computer system hosting the library or directly created within that system. Each component is provided with an air region for the CFD analysis, a mesh including the component and its surrounding air region and modelling properties. These features (and potentially other features) form a known component within the database. The known components can merely be selected and placed to create models without necessarily requiring any change in the meshing or other modelling properties.

Advantageously, the modelling properties for the component comprise all the properties needed for the simulation of the component, preferably including material properties and any particular properties of the component such as internal boundary conditions, thermal properties, flow rates and porosity.

The mesh resolution and thickness of the surrounding air region may potentially be set using a system default, but preferably an expert user decides the mesh resolution and the thickness of the surrounding air region. This allows expert knowledge to be captured within the database for each component.

According to an embodiment of a still further aspect of the invention there is provided a method of creating a CFD model for a multi-component product from a range of multi-component products, each product including a different combination of a plurality of components provided for the range, the method including for each of the components in a product in turn: selecting the component from a component library individually storing known components for the range, the known components including the component geometry, a mesh including the component and its surrounding air region and modelling properties; placing the known component in a desired configuration; and when all the known components in the product have been placed, creating and saving the data needed for CFD simulation as a CFD model.

In this aspect, the model creation is simplified by use of the known components previously mentioned with respect to the library creation aspect.

In many circumstances, particularly in the IT industry, there is a single base component on which other smaller components are housed. Therefore, in some embodiments each component is classified as a base, being the largest component in the product, or a component, being one of the remaining components.

This classification may also take place in the library creation stage.

Advantageously, the model creation process uses rules to steer the model creation. For example, each time a component is newly placed or modified (for example using a GUI) an intersection between the component and the previously included parts of the model is calculated and an intersection rule is automatically applied.

In many embodiments, the GUI would be used only to place the components on the motherboard or other base component (so to set location and rotation) and no modification takes place. However, for some components there are parameters that can be adjusted (e.g., the power of an internal heat source). If such parameters do not influence the mesh of the component, they can be set/changed from the GUI. Another possibility for modification is that a component could have a plurality of meshes associated with it, for example a fine version, intermediate version and coarse version. Then the GUI could be used to select the mesh with a preferred resolution. The modification(s) can take place at any appropriate time in the model creation phase.

Any suitable intersection rule may be applied in one example, an intersection between a newly placed or modified component and the model is calculated, and an intersection rule is automatically applied. In another example, an intersection rule does not allow intersection of the solid parts of components.

X and Y boundaries may be taken in some embodiments as the two-dimensional, "horizontal" extent of the motherboard or of a simulation domain. For such an arrangement, an intersection rule may trim any air region outside the X and Y boundaries of a simulation domain.

In a further example an intersection rule expands a simulation domain in the Z direction to include an air region of a component. The Z direction may be taken as the direction perpendicular to a motherboard.

The skilled reader will appreciate that any and all of these intersection rules may be applied according to the circumstances and that further intersection rules may apply.

Optionally, components may be split and/or combined once all the components have been added to a model, in order to increase efficiency during the solving stage. In one embodiment, once all the known components in the product have been placed, larger components (such as those exceeding a threshold size) and their surrounding regions are split using a mesh partitioning algorithm.

In another embodiment, once all the known components in the product have been placed, smaller components in mutual proximity (such as those with overlapping air regions) are combined into a larger component using mesh merging.

In an embodiment of a yet further aspect of the present invention there is provided a method of solving a CFD model of a multi-component product including a plurality of components, the method comprising using a plurality of solvers which are provided based on a division of the product according to the components in the product, each solver modelling a component group comprising part or all of at least one component, wherein a scheduler manages a time of action of each solver and data exchange between the solvers.

In this aspect of the invention, which may be used alone or in combination with any of the other aspects, a plurality of solvers (or a plurality of instances of the same solver) may be used in CFD simulation of a multi-component product. The division into solvers may not exactly follow the division into components, because the components may be split or combined as mentioned above in the model creation aspect, but the division is based on the meshing by component. A scheduler manages the timing in which the solvers act and also manages data exchanges between the solvers.

In one example, the scheduler allows one iteration for each of a number of solvers, before triggering data exchange between the solvers.

As mentioned above, each component may be a base or a normal component. Accordingly, the solvers may comprise a base solver and a number of component solvers. According to one embodiment, each solver is either a base solver which solves (models) the largest component in the product, or a component solver which solves the remaining components in the product.

In such an arrangement, the data exchange may be between each component solver and the base solver. For example, the base solver may transfer boundary conditions to each component solver and each component solver may transfer data for its entire volume to the base solver. This is especially appropriate for embodiments in which the base defines the extent of the simulation domain and the component solvers are sub-regions of the domain corresponding to the component in question, often with the finer mesh than the base mesh.

The scheduler may manage the time of action of the solvers in any suitable fashion. In one example, the scheduler is a flat scheduler which operates all the solvers in parallel and allows data exchange between all the solvers after one iteration.

In another example, the scheduler is a hierarchical scheduler which groups the components and allows convergence of at least one group before data exchange takes place.

For instance, each component may belong to a group and the base may be provided with its own separate scheduler. In such circumstances, the grouped components may undergo an iterative simulation to allow convergence before data exchange with the base takes place, whereas the base solver may carry out only one iteration of a simulation before data exchange with the grouped components.

This grouping is different from the one in the model creation phase. In the model creation phase combining (mesh knitting) is used to combine multiple component meshes into one. This is one kind of grouping. However, in the case of the hierarchical solver there is grouping without actually combining meshes.

For example, one group could be of memory modules, such as the four memory modules shown in FIG. 2, which is described in more detail later. For a number of iterations information is only exchanged between the memory modules and the motherboard. Then, after that part of the model is converged, information is exchanged with the rest of the model.

Any and all of these above method aspects and any sub-features of the method aspects may be combined or taken separately in invention embodiments.

The present invention also comprises computing system and apparatus embodiments whose features and sub-features may also be combined with each other and with the method aspects and sub-aspects of the method, in any combination or taken separately.

According to an embodiment of a yet further aspect of the invention there is provided a computing system arranged to implement a method of Computational Fluid Dynamics CFD simulation for a product including a plurality of individual components, the system comprising a library processor arranged to create a library of known components, including their component geometry and modelling properties needed for simulation and to store the library in a memory, the components being individually meshed within the library; a GUI arranged to allow a user to select and place a plurality of components from the library in a desired configuration to make up a CFD model of a product; a CFD simulator, which may include a scheduler and a coupler, the simulator operable to simulate the model by scheduling a plurality of solvers, each solver modelling a component group comprising part or all of at least one component, wherein the scheduler is arranged to manage the time of action of the solvers and to manage data exchange between the solvers using the coupler.

The invention may also relate to a plurality of computing systems which together comprise the library database, GUI functionality and CFD simulator as described herein.

According to one embodiment of a further aspect there is provided a computer apparatus arranged to implement a method of simplifying CFD pre-processing for a range of multi-component products, each product including a different combination of a plurality of components provided for the range, the computer apparatus including an input for a Computer Aided Design CAD model of component geometry; a library interface and processor allowing a library user to add an air region around the component; to create a mesh including the component and its surrounding air region for use in CFD analysis; and to set modelling properties for the component; and a component library individually storing known components for the range, each known component comprising the component geometry, mesh and modelling properties as a known component, wherein the component library allows selection and placing of the known components to create models of the products.

According to an embodiment of a still further aspect there is provided a computer apparatus arranged to implement a method of creating a CFD model for a multi-component product from a range of multi-component products, each product including a different combination of a plurality of components provided for the range, the computer apparatus including a selector arranged to select a component from a component library individually storing known components for the range, the known components including the component geometry, a mesh including the component and its surrounding air region and modelling properties; a positioning mechanism arranged to place the known component in a desired configuration; and a model generator arranged to, when all the known components in the product have been placed, create and save the data needed for CFD simulation as a CFD model.

The model creation aspect may provide a computer apparatus which includes a GUI, wherein the selector and positioning mechanism receive GUI input to select and position the component. The selector and positioning mechanism may be embodied as one or more programmed processors.

According to an embodiment of a still further aspect there is provided a computer apparatus arranged to implement a method of solving a CFD model of a multi-component product including a plurality of components, the computer apparatus comprising a CFD simulator including a scheduler and a coupler; wherein the scheduler is arranged to manage a time of action of a plurality of solvers which are provided based on a division of the product according to the components in the product, each solver modelling a component group comprising part or all of at least one component, and wherein the scheduler also manages data exchange between the solvers using the coupler.

In any of the above aspects, the various features may be implemented in hardware, or as software modules running on one or more processors. Features of one aspect may be applied to any of the other aspects.

The method aspects are intended for computer implementation and the individual components defined in the system and apparatus aspects may comprise processors and memory in combination with code arranged to execute on the computer hardware to provide the components defined.

The invention can be implemented as a computer program or computer program product, i.e., a computer program tangibly embodied in a non-transitory information carrier, e.g., in a machine-readable storage device, or in a propagated signal, for execution by, or to control the operation of, one or more hardware modules. A computer program can be in the form of a stand-alone program, a computer program portion or more than one computer program and can be written in any form of programming language, including compiled or interpreted languages, and it can be deployed in any form, including as a stand-alone program or as a module, component, subroutine, or other unit suitable for use in a data processing environment. A computer program can be deployed to be executed on one module or on multiple modules at one site or distributed across multiple sites on the vehicle or in the back-end system and interconnected by a communication network.

Method steps of the invention can be performed by one or more programmable processors executing a computer program to perform functions of the invention by operating on input data and generating output. Apparatus of the invention can be implemented as programmed hardware or as special purpose logic circuitry, including e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions and data.

The invention is described in terms of particular embodiments. Other embodiments are within the scope of the following claims. For example, the steps of the invention can be performed in a different order and still achieve desirable results. Multiple test script versions can be edited and invoked as a unit without using object-oriented programming technology; for example, the elements of a script object can be organized in a structured database or a file system, and the operations described as being performed by the script object can be performed by a test control program.

The apparatus according to preferred embodiments is described as configured or arranged to carry out certain functions. This configuration or arrangement could be by use of hardware or middleware or any other suitable system. In preferred embodiments, the configuration or arrangement is by software.

Elements of the invention have been described using the terms "selector" and "positioning mechanism", "scheduler", "coupler" and other functional terms. The skilled person will appreciate that such terms and their equivalents may refer to parts of system or apparatus that are spatially separate but combine to serve the function defined. Equally, the same physical parts of the computing system or apparatus may provide any two or more of the functions defined.

For example, separately defined parts may be implemented using the same memory and/or processor as appropriate.

BRIEF DESCRIPTION OF THE DRAWINGS

Reference will now be made, by way of example, to the accompanying drawings showing the prior art and embodiments of the invention in which.

DETAILED DESCRIPTION

Figure 1:
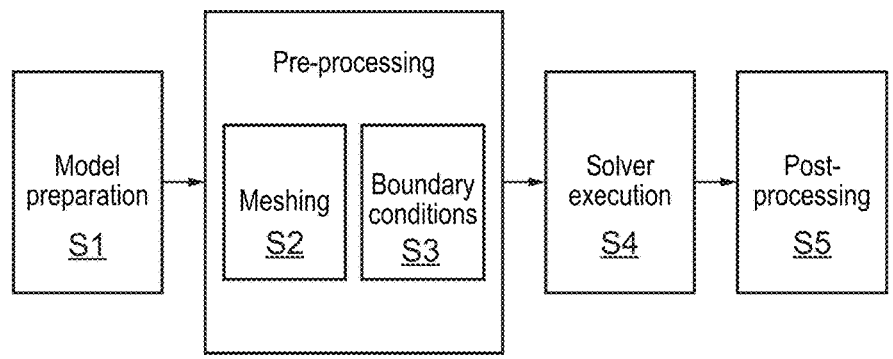
FIG. 1 (described above) is a flow chart of a prior art CFD simulation.

Reference will now be made in detail to the embodiments, examples of which are illustrated in the accompanying drawings, wherein like reference numerals refer to the like elements throughout. The embodiments are described below to explain the present invention by referring to the figures.

Figure 2:
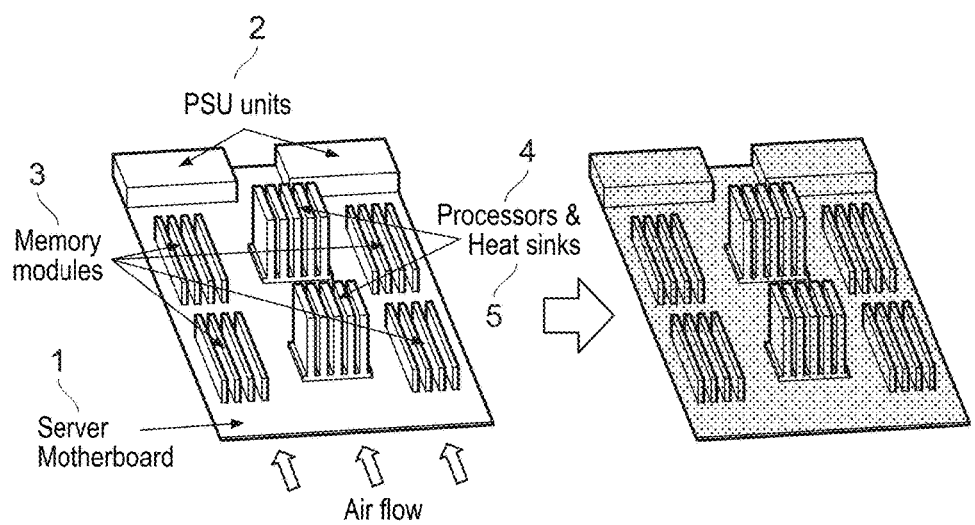
FIG. 2 is a 3D representation of a simple model to be simulated (left) and its corresponding mesh (right)

A very simplified case of conventional CFD analysis is shown in FIG. 2 (left), where the model to be simulated contains a server motherboard 1 equipped with two Power Supply Units 2 (PSU), 16 memory modules 3 grouped into four groups and two processors 4 with their heat-sinks 5. After the CAD model is created or loaded, a mesh for the entire model is created, like the one shown in FIG. 2 (right).

Figure 3:
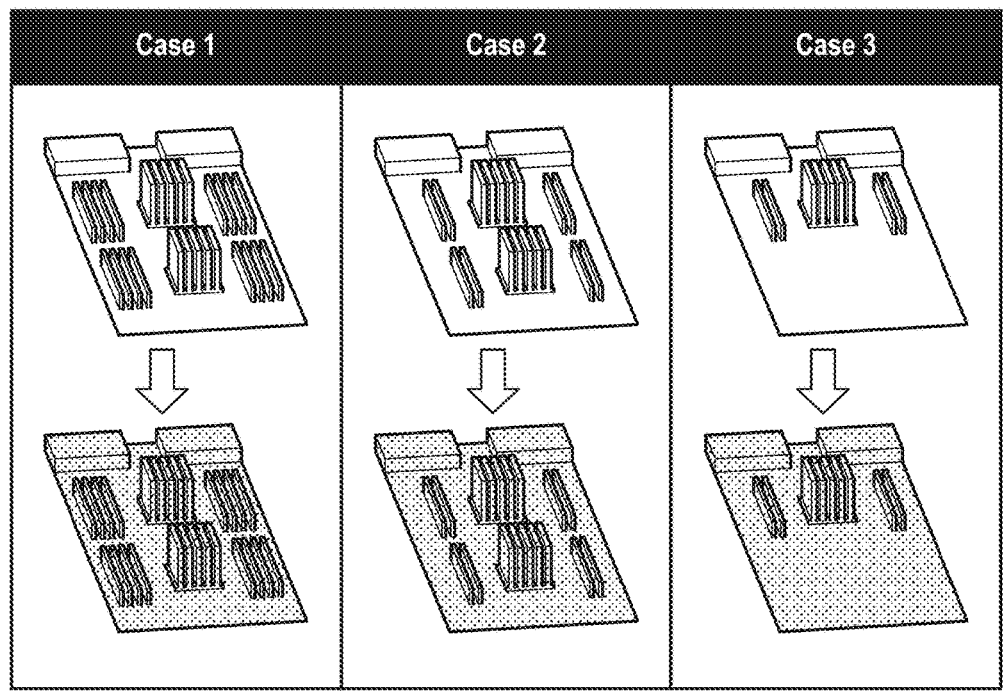
FIG. 3 is a 3D representation of different scenarios to be simulated.

In general, by choosing the right combination of available components, the hardware manufacturer or system integrator can provide a large number of hardware configurations. For example, three such combinations are shown in FIG. 3: a high performance—large memory configuration (Case 1), a high performance—lower memory configuration (Case 2) and a low performance—low memory configuration (case 3). All these cases need to be simulated and, in the traditional approach, all models need to meshed from scratch.

After the preprocessing stage has been finalized, an appropriate CFD solver is executed and the obtained results are then analyzed. For complex models where a high-resolution mesh is required, running the CFD solver is very time consuming. Some CFD solvers employ parallelization strategies in order to run on multiple CPUs in the same compute node or across multiple nodes. However, there are still many CFD solvers that are either not capable of parallel computations or their performance does not scale well to large number of processors as available in many current clusters.

Figure 4:
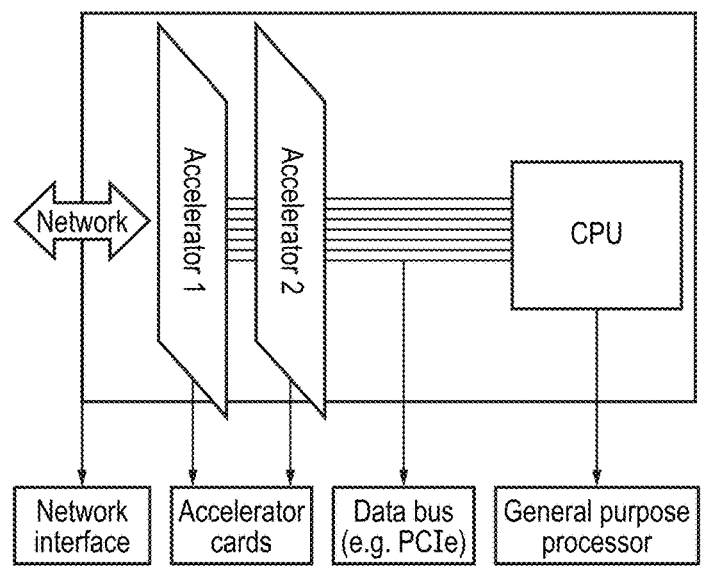
FIG. 4 is a structural diagram of a computer with accelerators.

Recently, more and more computers, especially in high-end cluster and supercomputers, have become "heterogeneous". Heterogeneous computers employ not one but several types of processors in order to increase the speed and efficiency of the computation. Currently, almost all such systems follow the "accelerator" paradigm, where accelerators like Graphic Processing Units (GPUs), Intel Xeon Phi co-processors or Field Programmable Gate Arrays (FPGAs) are used to augment the computational power of the CPU. An example of an accelerated node is the one shown in FIG. 4, in which two accelerators (Accelerator 1 and Accelerator 2) are connected to the host system via a PCI Express bus.

Figure 5:
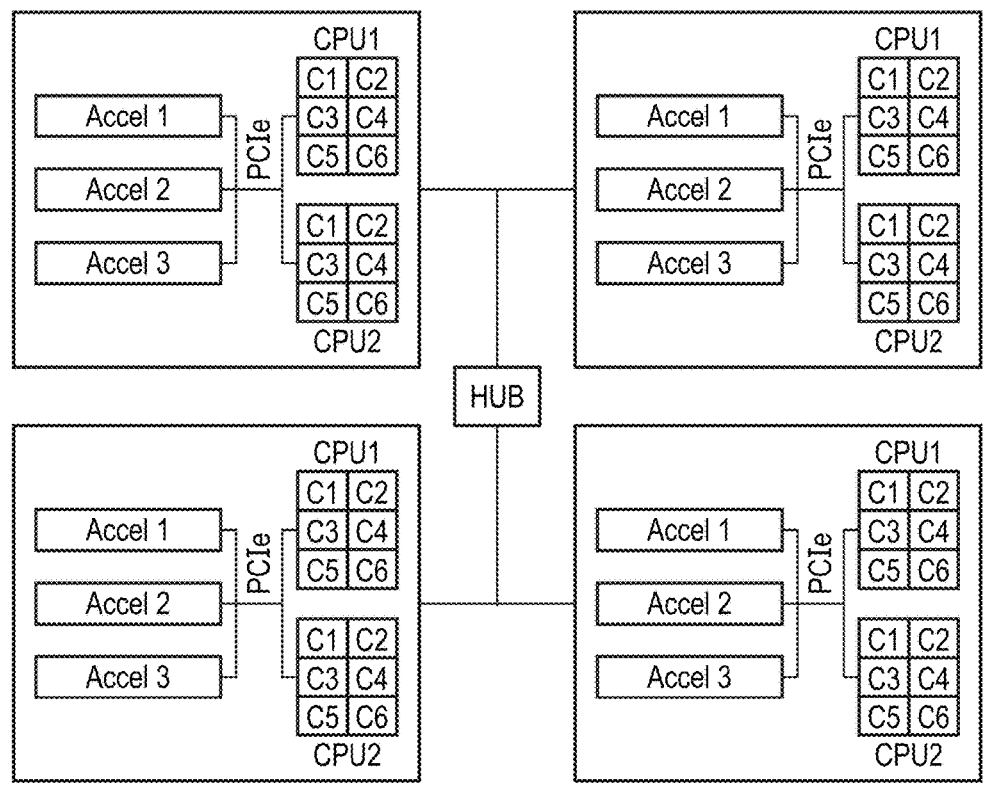
FIG. 5 is a structural diagram of 4-node heterogeneous cluster with 2 multi-core CPUs (6 cores each) and 3 accelerators per node.

Using a network interface like Gigabit Ethernet or Infiniband, several accelerated nodes can be combined into a heterogeneous cluster, like the one shown in FIG. 5, which is an example of a 4-node heterogeneous cluster with 2 multi-core CPUs (6 cores each) and 3 accelerators per node.

Currently there exist a small number of CFD codes capable of running on a heterogeneous cluster. An example of such code is OpenFOAM (www.openfoam.com) that can be run on a GPU cluster if combined with a GPU-accelerated solver like SpeedIT (speed-it.vratis.com/). When the model is treated monolithically as it is done in the traditional approach, the simulation is partitioned across the accelerators and a large amount of communication via the network and across the PCI Express bus is required at each solver iteration for data to be exchanged between accelerators. This communication soon becomes an important bottleneck and limits the scalability of the solver.

In general, the creation of the computational mesh and the solver are by far the two most time consuming steps in the CFD simulation. In the particular case when the model to be simulated is actually a combination of a number of components, the traditional approach to CFD simulation suffers from the following drawbacks:

At the pre-processor level, a computational mesh has to be recreated after every change to the model, no matter how small.

At the solver level, treating the model in a monolithic way does not generally provide the necessary level of parallelism required by the highly parallel current and next generation computing platforms. Moreover, heterogeneous systems cannot be efficiently exploited because of the large amount of communication that is required.

Embodiments of the invention address the large time that is currently required to simulate complex CFD models. In particular, for the case of models that are actually a combination of a number of components, they may address one or both of the following issues:

The need to recreate the computational mesh for every different simulation; and

The inefficiency of the solver on large scale machines and, in particular, on ones with a heterogeneous architecture.

Embodiments of the invention provide a new Computational Fluid Dynamics (CFD) simulation system that is both computationally efficient and requires less user intervention than a traditional CFD simulation system.

The scheduler of this embodiment relies on the multi-component approach for task parallel processing. In order to exploit task parallelism, multiple solvers or multiple instances of the same solver run (the terms "solvers" and "solver instances" are used interchangeably herein, to indicate separate solvers which may, or may not, be identical in coding, but which are executing on different parts of a CAD model). In other approaches, the solver is a monolithic one (with just one task, and no task parallelism).

As set out above, current CFD simulation practice involves a monolithic approach, where the entire model to be simulated is first created then solved using one of the large number of CFD solvers currently available. The creation of a simulation model requires expert knowledge, with a CFD specialist being required to set the correct model resolution, material properties and other model parameters. The need to create a computational mesh makes the setup of complex models even more difficult and time-consuming. Moreover, while some of the available CFD solvers are capable of large-scale parallel computation, there are many solvers that either lack such capabilities or are unable to scale to large numbers of processors.

Embodiments of the current invention use a so called "Multi-component CFD" or "domain decomposition" approach, according to which a complex model is seen as a combination of smaller components. These components can be set up independently and added to a component library, which is used by the user to create complex models. In a way, creating a new model according to invention embodiments is analogous to building an electronic device, where the builder selects suitable components from a catalog, one at a time, and places them at the correct location on a board. At runtime, a smart scheduler may run multiple CFD solvers or multiple instances of the same CFD solver and exchange data between them so that the simulation is performed not monolithically but in a component-by-component fashion. In this way, the "Multi-component CFD solver" approach of invention embodiments can not only drastically simplify the model setup phase but also increase the level of parallelism in the solving phase. A simplified layout of the proposed system according to one embodiment is shown in FIG. 6.

The current invention is particularly suited to complex products and systems, so that it is most likely to find application in the IT industry, for example in modeling air flow and heat transfer inside notebooks, desktops and servers, and in the manufacturing of automobiles and aircraft. Data centers, which tend to have a relatively simple structure, are probably better suited to a straightforward monolithic approach.

Figure 6:
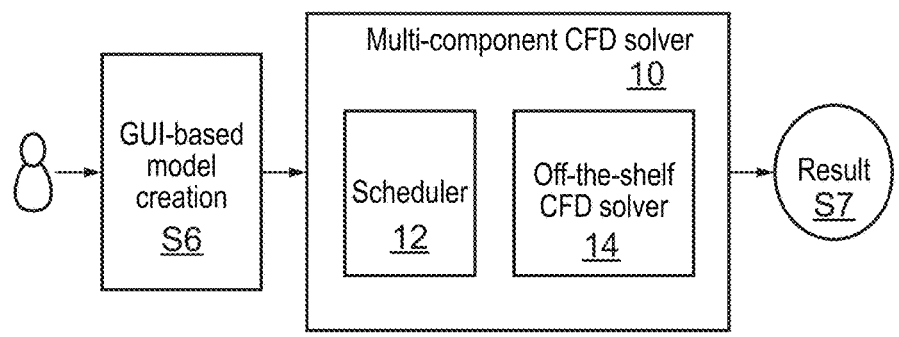
FIG. 6 is an overview of a multi-component CFD process.

In the embodiment shown in FIG. 6 a user works with a GUI to create a model of a multi-component product. This is shown as step S6. The GUI can be specially adapted to the multi-component approach as explained in more detail in the following.

Figure 7:
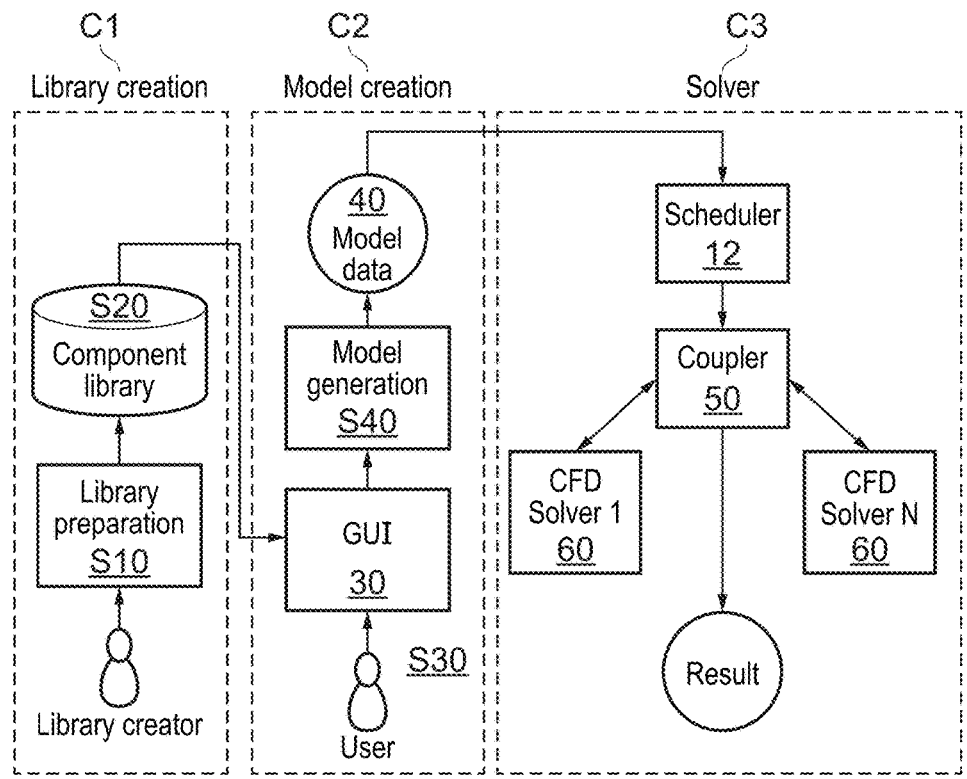
FIG. 7 is a flowchart of an exemplary system according to an invention embodiment.

The model is then used for simulation in a multi-component CFD solver 10, potentially comprising a scheduler especially adapted for multi-component CFD simulation as described in more detail hereinafter and an off the shelf CFD solver 14. The result is produced in step S7. FIG. 7 gives a layout of a more detailed system according to invention embodiments.

The system is shown in FIG. 7 and has three main components:
  1. Library creation component C1
  2. GUI based model creation component C2
  3. Smart scheduler based solver component C3

The first stage of this embodiment is the library creation stage C1, where basic components of the model are prepared for the simulation S1O (i.e., various properties as heat sources, flow rates, material properties and so on are added), meshed in isolation, and then added to a component library database S20. A library processor is required for this stage. A library user interface is also usually required. While the process is usually a manual one requiring a user interface, it can also be automated. Regardless of how this process is performed, this stage can have several key aspects:
  this step has to performed only once per component
  all properties for each component are saved in the library together with the geometry expert knowledge in the form of mesh resolution, amount of surrounding air, properties, etc is accumulated in the component library The second stage of this embodiment is the model creation stage C2. A user uses a GUI-based environment linked with the library and a processor (and memory to store the model during and after creation). In step S30 GUI 30 is used to create the model to be simulated by choosing and placing components from the previously populated component library. After the components are selected and boundary conditions are set, the models are automatically combined by a model generator in the system in step S40 and model data 40 (the input data for the solver) is created without user intervention. The key aspects of this stage can be:

- no meshing is required
- no properties (e.g., material, internal boundary conditions, etc) need to be set, however they can be updated by the user if needed
- created models can themselves be added as components to the component library The third stage is the solver stage C3, with a selector 12 controlling a data coupler 50. Instead of running the simulation as one monolithic model and executing only one instance of the solver, in the current approach of this embodiment, multiple solvers are executed, one for every component or for a group of components. It is also possible to run multiple solvers for just one single component. Coupling technology is used to exchange data between the multiple solvers 60 so that the final results match the ones for the original, monolithic simulation. The key aspect of this stage is that it is computationally efficient on modern computer architectures.

In this, and the other embodiments, a single computer system can provide functionality for all three stages, or the processing in each stage can be carried out by a separate computer system, with data transfer between the stages. For example, the library creation may be carried out by a specialist CAE firm, the model creation by a server design and manufacturing firm and the final simulation and solvers may be hosted on a cloud so that each stage involves a separate computing system, run by a separate commercial entity. Alternatively, all three stages may be executed within a single system.

Library Creation

One particular embodiment of the invention relates to component library (database) creation, which is the first stage of a multi-component CFD system. The component library is created from CAD components which have been processed and meshed. In order to create the example shown in FIG. 2 and those of FIG. 3, four types of components need to be present in the component library: PSU component, Memory module component, Heat sink component and Motherboard component.

Figure 8:
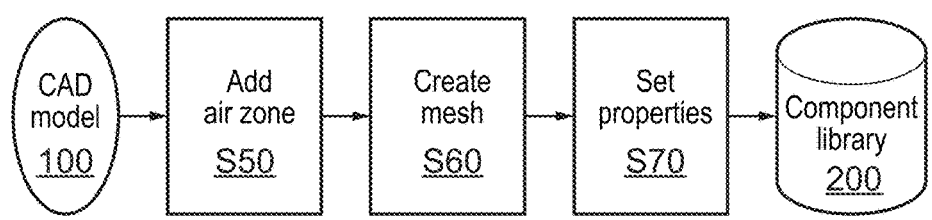
FIG. 8 is a flow diagram of processes for preparing a component and adding it to the component library.
Figure 9:
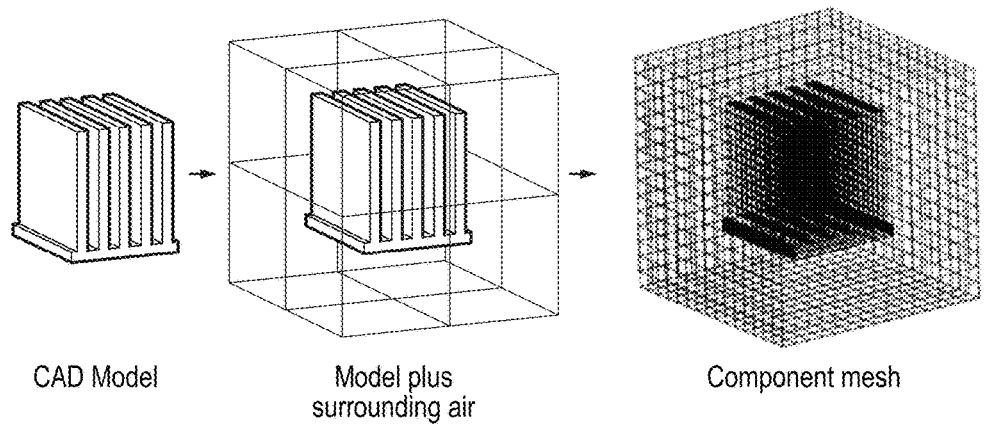
FIG. 9 is a 3D step-by-step view of creating a component model for a heat sink example.

The process described in FIG. 8 is used to add a new component to the component library while an example of this process, for the heat sink component, is given in FIG. 9. It is as follows:

1. The process starts with a CAD model of the component in a supported CAD format (e.g. STEP, IGES)
2. A region of air of the desired thickness (which can be either chosen by the user or a system default) is added to the component in step S50. Note that it usually requires expert knowledge to decide how much air is needed in each direction for a specific component, and by adding it at this stage, this knowledge will be captured in the library on a per-component basis
3. A mesh consisting of the component and the surrounding air added in the previous step is created in step S60. This step also requires expert knowledge. As can be seen from FIG. 9 the component has a finer mesh than the surrounding air region.
4. Set properties are set for the component
   a. Material properties
   b. Internal boundary conditions (can be activated at a later stage)
   c. Special thermal properties like the introduction of heat sources
   d. Flow rates for fans and similar parts
   e. Porosity
   f. Etc.

The material properties are the material properties corresponding to each specific component. Actual material information is stored in an additional database which, for each material name (e.g. Aluminium, Copper) will store various physical properties (density, heat conductivity, specific heat, etc).

One example of an internal boundary condition, e.g. for a CPU model, is a heat source. In the case of the heat source, the amount of heat generated by it could be either a default value or a user specified value (e.g., 75 Watt). Since the value is a simple parameter it can be changed even after the component has been saved in the database (for example when selecting a component with the GUI).

An example of a further set property is classification of the component as a "base" or as a normal component, as explained in more detail hereinafter.

5. The completed component is added to the component library 200.

It is important to note that by setting all properties associated to a component at this stage and saving them in the library together with the geometry, much of the expert knowledge needed to set up the model can be captured and accumulated in the component library. This makes it possible for non-expert users (e.g., designers) to set up models with little or no expert advice.

The component library embodiment includes at least the following original elements:

- The concept of a library with contains, for each component, both geometry and all properties needed for the simulation
- The procedure for adding elements Model Creation The following examples refer to a simulation domain in X, Y and Z co-ordinates. The X and Y co-ordinates can refer to the horizontal extent of a motherboard (or entire air region or other base component defining the X and Y extent of the simulation domain). The Z co-ordinate refers to the "height" direction perpendicular to the motherboard, air region or other base component. As a general rule, the base component mesh extent defines the size of the simulation domain and the other component meshes are higher resolution meshes within the base component mesh.

GUI-Based Model Creation

Another particular embodiment of the invention relates to model creating using a GUI.

After the component library has been set up, the user uses a GUI environment to prepare the model to be simulated. The model is prepared by choosing one or more components from the component library and by placing each one at their desired position. Since all components have already been meshed, no meshing is needed at this stage.

The key here is to provide the user with an easy and efficient way of selecting components from the library, placing them in the model and visually checking the layout. The GUI described below is an advantageous way of achieving these tasks, especially for visually checking the model layout.

Figure 10:
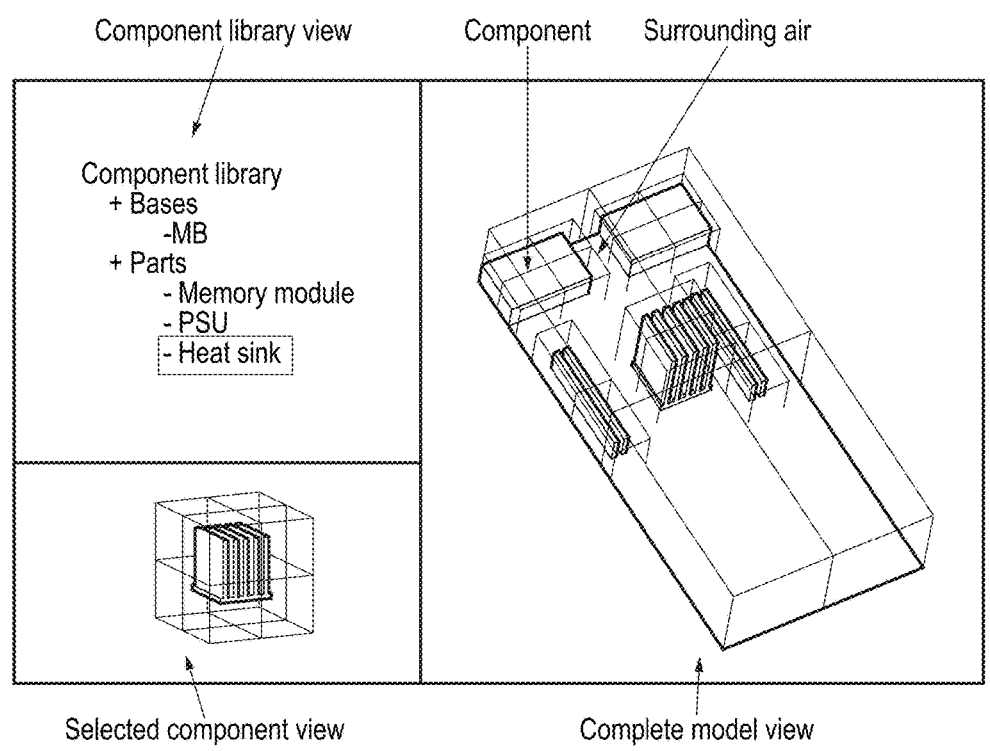
FIG. 10 is a view of the GUI main application window.

A sample layout of the GUI, targeted towards IT simulations is shown in FIG. 10. The GUI is divided into three main views:

The component library view shows the components available in the library. The components are divided into two categories: bases, which are the parts of the model that do not change (or change much less often), and components, which are the small components whose position and configuration vary greatly from simulation to simulation. Note that a section of air of the size equal of that of the simulation domain can also act as a base.

The selected component view shows the model, surrounding air and other properties related to the component in the library that is currently being selected The complete model view shows the entire model with all the components at their designated locations and together with the surrounding air regions.

Figure 11:
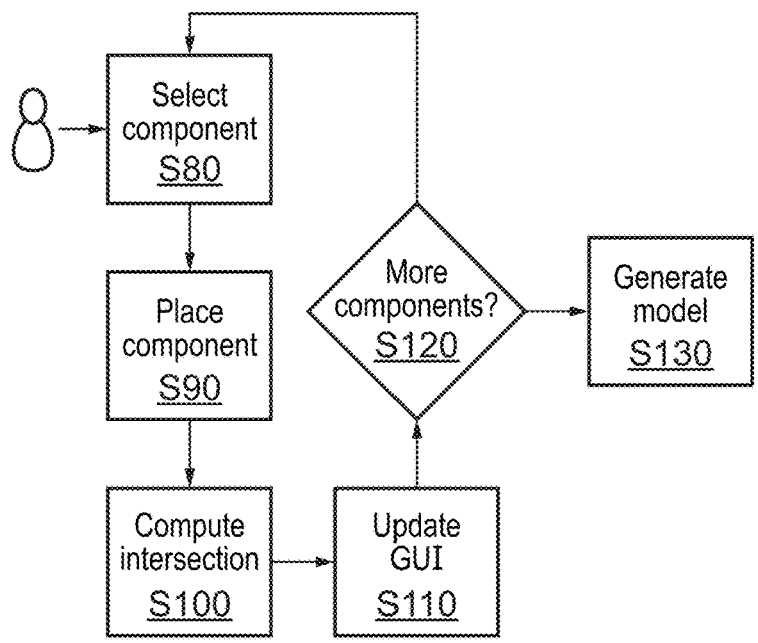
FIG. 11 is a flowchart of a model creation procedure.
Figure 12:
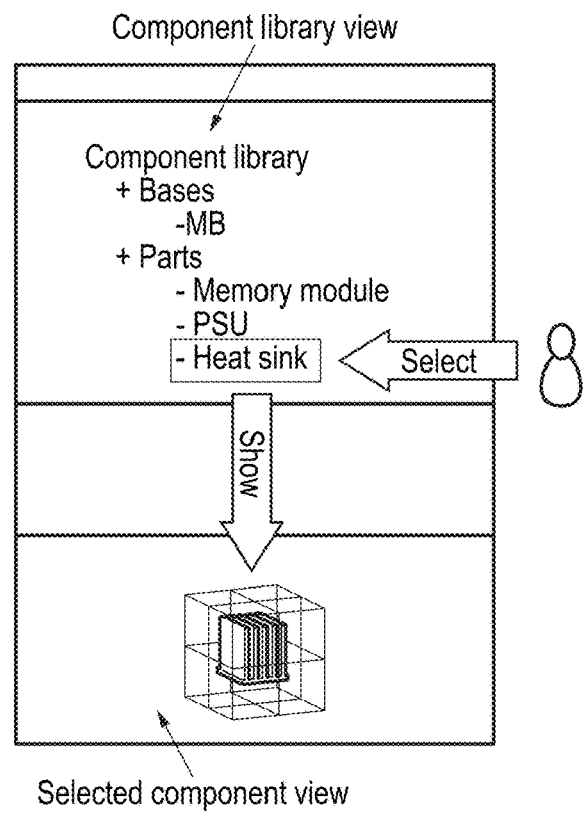
FIG. 12 is a view of component selection in the GUI.

Model creation proceeds as shown in FIG. 11. The steps are as follows:

Select Component:

The user uses the GUI to select a component in step S80 from the component library in the Component Library View. Upon selecting the component, the model (including surrounding air zone) is displayed in the Selected Component View. This process is shown in FIG. 12.

Generally, the user will first choose a base such as a motherboard, including its air region and other components are subsequently added within the air region of the motherboard.

Figure 13:
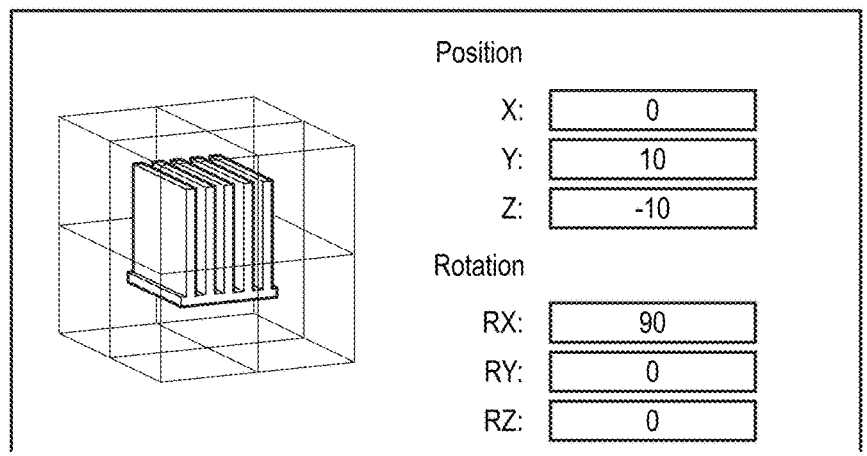
FIG. 13 is a view of placing a component in the GUI.

Place Component:

After selecting the component in Step S80, the user specifies the location where the component will be placed and the associated rotation, if required, in step S90. An example of how this might look like is shown in FIG. 13.

Compute Intersection:

Upon placing or modifying a component, the system computes the intersection between the new or modified component and the components already present in step S100. Although other intersection rules may be additionally or alternatively implemented as well, some possible rules are as follows:

No solid intersections: the solid parts of two or more components are not allowed to intersect (an error message is shown to the user if that is the case)

Figure 14:
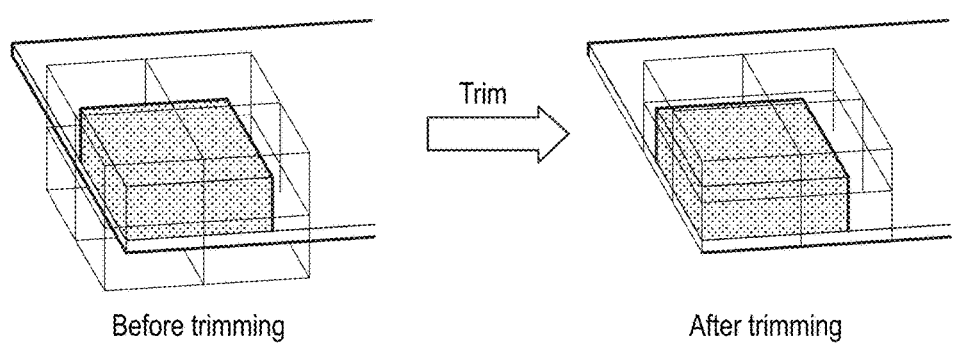
FIG. 14 is a view of example of a trimming operation.

Trimming: the air region outside the boundaries of the simulation domain in the X and Y directions is removed (see FIG. 14 for an example)

Figure 15:
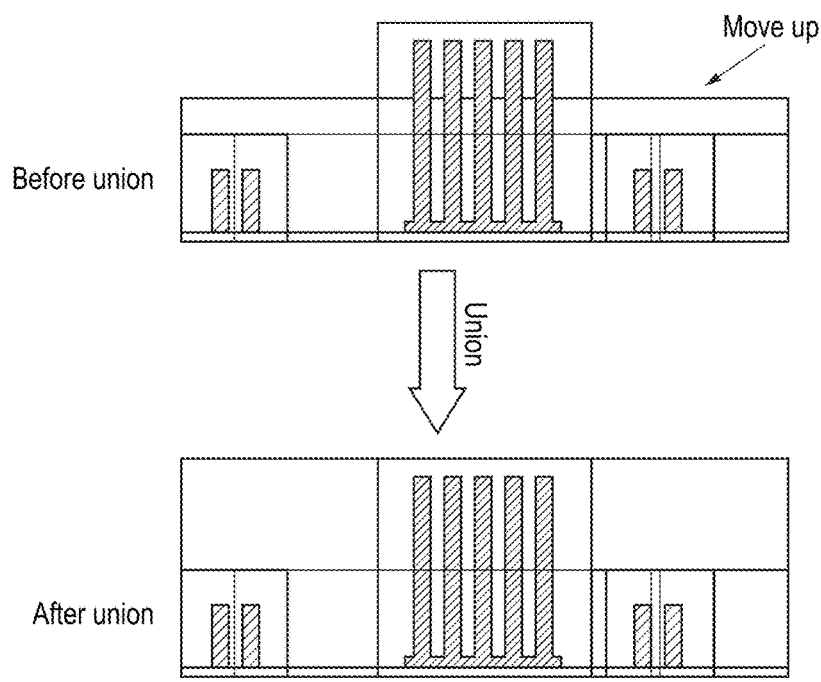
FIG. 15 is an example of a union operation.

Union: the simulation domain is automatically expanded in the Z direction to include the air region of all components (see FIG. 15 for an example)

Warnings: the system can warn the user if the boundaries of a part exceed the boundaries of the simulation domain.

Update GUI:

After the intersection between the new/updated component and the previous components has been computed, the GUI is updated in step S110 so that the Complete Model View from now shows the updated complete model.

More Components (Step S120):

The previous steps repeat until the user decides that there are no more components to be added or modified.

Generate Model (Step S130):

After the user decides there are no more components to be added, the data needed for the model to be simulated is created and saved in a format readable by the Solver stage. There may also be an initial refinement process, as explained below.

Once the user has assembled the model to be simulated (for example a motherboard and a selection of components) then there is the option of keeping the model as it is or, optionally, splitting or combining components in order to increase efficiency during the solving stage.

Mesh assembly includes the situation in which individual meshes are put together, but an assembled mesh does not become one simple connected mesh. Even if two mesh parts are in physical contact, their interface will contain two sets of nodes and elements, one set for each mesh. More formally, there is no element in the assembled mesh which has nodes belonging to the meshes of more than one part. Only in the mesh combining case are the individual meshes modified, for example using a "knitting" method if the meshes of two components are to be combined into one.

Figure 16:
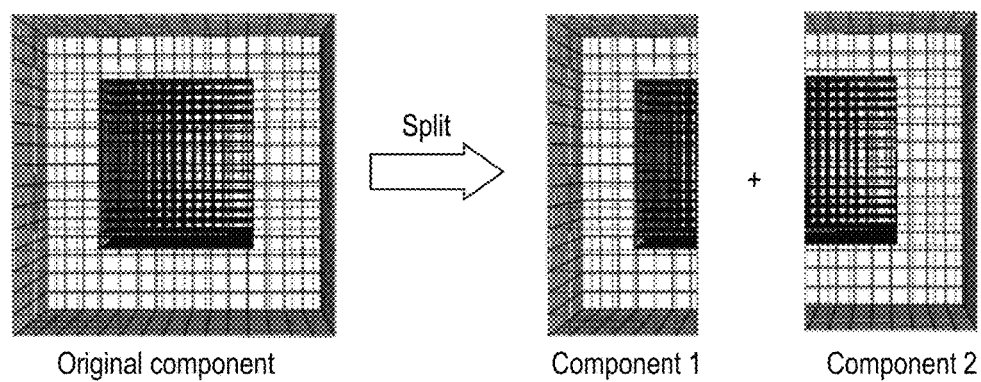
FIG. 16 is an example of component split operation.

Thus at this stage, considering the characteristics of the target system and characteristics of the model, two more operations are possible:

Component splitting: very large components can be split into two or more sections such that the amount of available parallelism to be increased. The component and the air region around it is split using one of the mesh partitioning algorithms known in the art. An example of this operation is shown in FIG. 16. The user may define what size or what type of component will trigger mesh partitioning, at this stage or earlier in the process, for instance by using specific manual input or by defining an overall size threshold.

Figure 17:
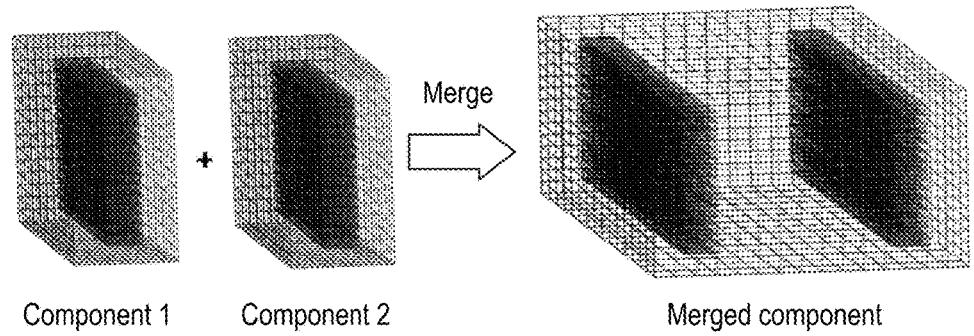
FIG. 17 is an example of component merge operation.

Component merging: smaller components placed closed together can be combined into one larger component. An advantage of this operation is faster convergence when implicit solvers are used, since there are fewer interfaces that need to be converged. Moreover, from a computational point of view, larger components usually result in better performance on some accelerators like GPUs. Component merging is realized by extending and combining the air regions around the original components using mesh merging algorithms known in the art. An example of this operation is shown in FIG. 17. Component merging can be triggered by component proximity, in a simple example by any overlap of adjacent component air regions.

The model generation stage creates the actual data that is read by the solver. If there is no modification to the component models (e.g., no splitting or combination of components), then the data generated in this stage is the mesh data for the motherboard and each of the components plus information about the interconnection relationships between components (in case there is hierarchy of groups of components as explained in more detail hereinafter). If there are modifications to the component models then the modified component meshes will be also generated in this stage.

The model creation embodiment includes at least the following original elements:

The GUI

The operations performed on components

Batch-Type Processing to Select Components from the Library

The library concept can be used without a GUI. However, there must always exist some way in which the user can create the model using components from the library. While the best and easiest method to do this might be via a GUI, it is possible that a batch-type system might be used. For example, the user could provide a script with operations to be executed (e.g., select component #25, place at position (1,1,4) and rotate by 45 degrees with respect with the X axis). This would be a very time consuming task, but could be appropriate in some circumstances (for example to create a large range of products with very minor variations).

Multi-Component Solver

A further particular embodiment of the invention relates to the solver step, which can follow the multi-component approach, in which one instance of a CFD solver simulates only one component or a group of components. This is different from the traditional approach, in which one solver instance is used to simulate the entire model.

Thus the scheduler of this embodiment relies on the multi-component approach for task parallel processing. In order to exploit task parallelism, multiple solvers or multiple instances of the same solver run. In other approaches, the solver is a monolithic one (with just one task, and no task parallelism).

Figure 18:
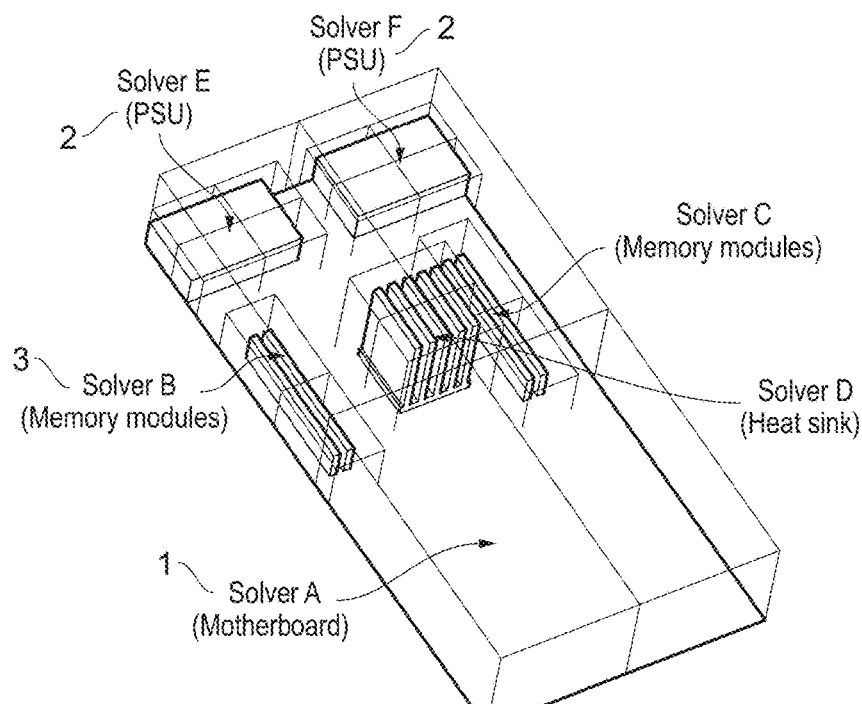
FIG. 18 is a 3D view showing division into solvers.

An example of a component-based solver approach is given in FIG. 18, where six instances of CFD solvers are used, in parallel, to perform the simulation. In this example, Solver A is in charge of simulating the Motherboard 1, Solvers B and C deal with the left and right memory banks, respectively, where the memory module components 3 from each bank have been merged into one component; Solver D deals with the heat sink while Solvers E and F deal with the PSU2.

At the core of the component-based solver in this invention embodiment there are two components: a scheduler and a coupler.

The Scheduler

The scheduler is in charge of managing the multiple solver instances. Each solver is treated as an independent piece of code, that can run in serial or parallel. The scheduler will launch and terminate multiple instances of the same or different CFD solver codes and intermediate the exchange of data between the individual solvers.

Figure 19:
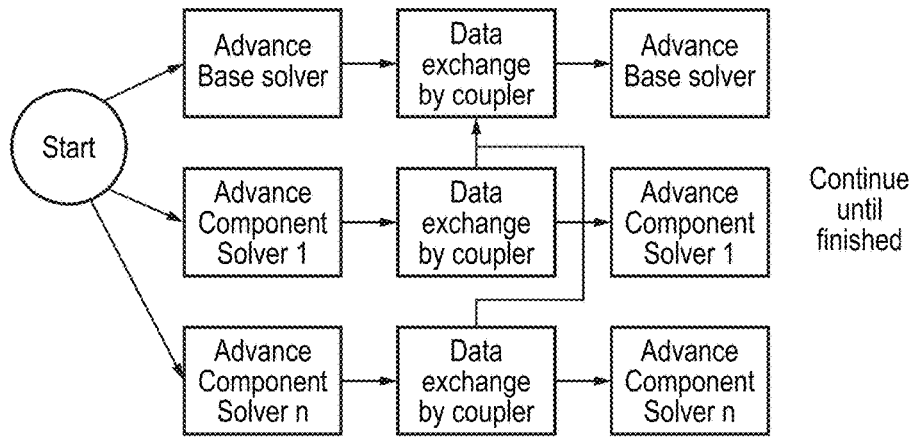
FIG. 19 is a process flow diagram for a flat scheduler.

This invention proposes two types of schedulers:
Flat scheduler, where there all solvers at the same level
Hierarchical scheduler, where solvers are organized in a tree-like fashion The layout of a flat-type scheduler is shown in FIG. 19. A distinction is made between a base solver (e.g., the one for the motherboard or for the larger component in the system) and component solvers. Note that it is also possible to consider a mesh containing only air with a size as large as that of the simulation domain to be the base, and to consider all components including Motherboards as component solvers, if this is preferable to the user. After advancing all solvers one step in time, a data exchange operation is performed, via the coupler, between each component solver and the base solver.

Figure 20:
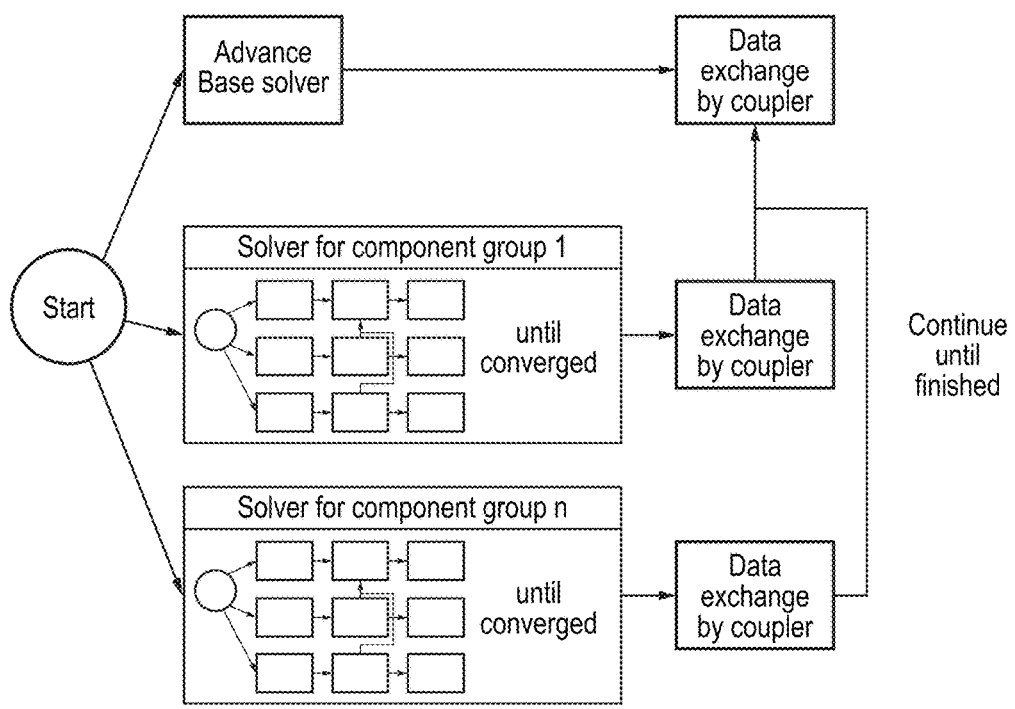
FIG. 20 is a process flow diagram for a hierarchical scheduler.

The layout of a hierarchical-type scheduler is shown in FIG. 20. In a hierarchical scheduler, parts of the model (for example including several components) are independently simulated in either a flat-type way or in a hierarchical type way and data is then exchanged for a part at a time rather than for a component at a type.

From a computational point of view, one important advantage of the hierarchical type scheduler is that data exchange is localized, making the algorithm more computationally efficient.

Figure 21:
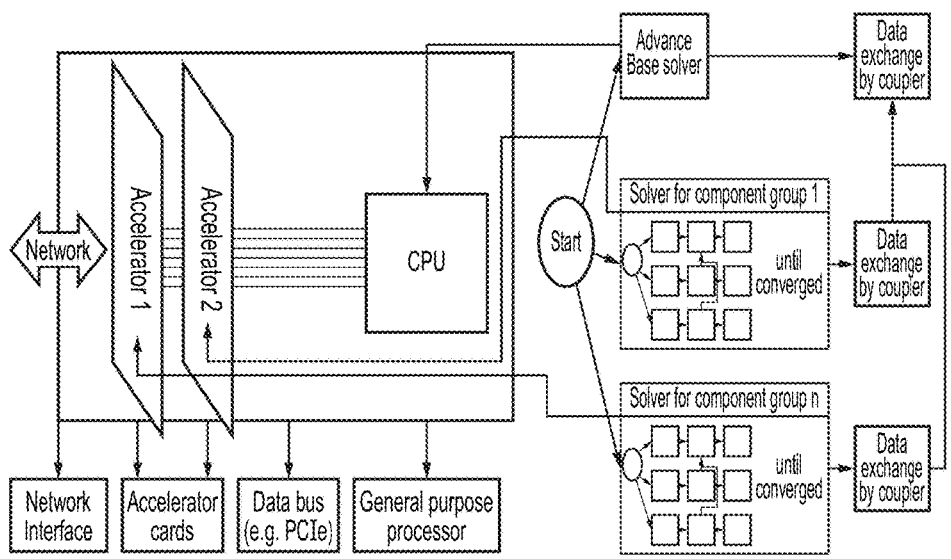
FIG. 21 is a linked view of hierarchical-type scheduler mapping solvers to a heterogeneous system.

The data exchange is localized because the exchange of data with the base mesh is only done in a small part of the entire domain. Hence, for example, the exchange of data could all take place inside the memory of one node or one GPU. In the example shown in FIG. 21, the solving for all components in group 1 is done on Accelerator 1 while all components in group 2 are handled by accelerator 2. The base solver runs on the CPU. While data exchange between the solvers handling the components in each group has to take place often, the cost is reduced since all the transfers happen inside the memory of the accelerator assigned to that group. After the simulation for all groups has converged, data exchange between each group and the base solver has to be done. After data is exchanged, the process is repeated until the entire simulation is completed.

The Coupler

The coupler component deals with data transfer between components. Standard interpolation procedures are used to transfer data between the different meshes. Moreover, advanced coupling algorithms like FETI can be used to increase the speed of convergence.

In general, data exchange is done in 2 stages (and both stages are carried out in each "Data exchange by coupler" entry in the layouts shown in the figures):

Base mesh→ Component mesh

Before a flow step can be performed, data from the grid associated with the base solver (which usually is working with a coarser mesh) is transferred to the grids associated to component solvers (which usually work within finer meshes)

The component boundaries require boundary data from the flow field of the base mesh.

Component mesh→ Base mesh

After a flow step has finished, data from the meshes associated with components is transferred to the mesh associated to the base solver.

The component internal flow field data (entire volume) is transferred back to the base mesh.

The solver stage in this embodiment of the invention includes at least the following original elements:

The scheduler

Alternative Solver Structures

A particular solver methodology will always be required. Basically, there are three approaches one can take:
1. Multi-component approach (described in more detail hereinbefore).
2. Overlapping or embedded [i.e. assembled] mesh approach, using existing (but special, advanced) monolithic solvers like the Overture solver.
3. Using a monolithic approach (i.e., standard solver) if the component meshes are knitted (merged) into a single monolithic mesh. This is possible at least for polyhedral (solid geometry) type meshes.

Figure 22:
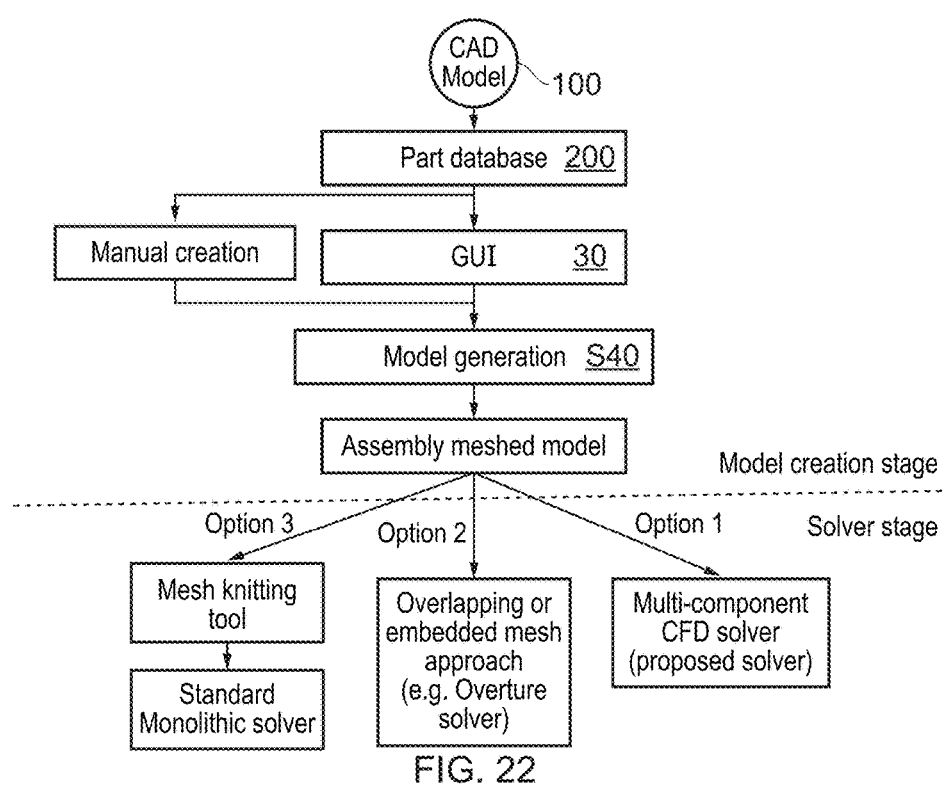
FIG. 22 is a flowchart showing some options in invention embodiments.

FIG. 22 is a flowchart demonstrating some of the options of invention embodiments. The input to this CAE process is a CAD model 100 of a component. The component is prepared as previously explained and stored in the component library or part database 200. In order to generate the model, components are selected from the library by use of a GUI 30 or by manual creation or potentially by a mixture of these two methods. Model generation takes place in Step S40 and produces an assembled meshed model. This completes the model creation stage. There are 3 options for the solver stage. In option 3 the assembled model undergoes a knitting process to form a single mesh and a "standard" monolithic solver is used for the simulation. In option 2 an overlapping or embedded mesh approach is taken, using "Overture" or another more complex monolithic solver suitable for solving problems on a collection of structured grids.

In option 1, an embodiment of the present invention provides a multi-component CFD solver, with one solver per component or instance of a solver used per component.

Benefits of Invention Embodiments Over the State of the Art

When performing repeated CFD simulations on models composed of a limited number of components, embodiments of the invention as described in this invention can have any or all of the following major advantages over state-of-the-art CFD systems:

- Each component needs to be meshed only once, regardless of how many models are being simulated, leading to significant time savings
- The system can be used by less experienced users (e.g., designers), as expert knowledge is captured in the component library in the form of component properties
- Meshing complexity decreases since each component is meshed in isolation
- The automation of the model creation phase is increased as manual operations often required during the meshing stage are no longer required (all components are meshed once only at the correct resolution)
- The degree of parallelism in the solver stage is increased as multiple solver instances can be ran in parallel. In this way, parallel computation is possible even when serial CFD solvers are used
- By simulating the model one part at a time rather than as a whole, complex models can be simulated with limited computational resources (albeit at the cost of increased computational time)
- Heterogeneous architectures can be efficiently exploited by reducing communication to/from accelerators Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method in a computer system including a processor and memory to simplify Computational Fluid Dynamics (CFD) analysis including pre-processing and processing for a range of multi-component information technology (IT) products, each IT product comprising a different combination of a plurality of components provided for the range, the method comprising:

by the processor, for each of the plurality of components in the range of the IT products:
  obtaining a Computer Aided Design (CAD) model of a geometry of a component among the components;
  adding a surrounding air region around the component;
  creating a mesh comprising the component and the surrounding air region for use in the CFD analysis;
  setting modeling properties for the component; and
  adding the component geometry, the mesh and the modeling properties in form of information of a known component to a component library in the memory to store information of known components for the range of the IT products;
    wherein the component library allows selection and placing of the known components to model IT products, and
    wherein to model an IT product, a component among components in a model of the IT product is classified as a base model, being a largest component in the modeled IT product, and including a base component mesh which defines a size of a simulation domain, and at least one normal component model, being one of remaining components among the components in the modeled IT product, with a higher resolution mesh within the base component mesh;
  displaying the selection and placing of the known components through a Graphical User Interface (GUI) which is divided into a plurality of windows to display a combination of views including a component library view of the known components, a selected component view, or a complete model view; and
  routing the model of the IT product to a plurality of solvers executing in the computer system in parallel, thereby simulating airflow and heat transfer among the components of the modeled IT product, the solvers being provided based on a division of the modeled IT product into components to execute a base solver corresponding to the base model and a number of normal component solvers corresponding to the at least one normal component,
    wherein the base solver iterates to solve the base model and the normal component solvers iterate to solve the at least one normal component model,
    wherein the base solver transfers boundary conditions to each normal component solver and each normal component solver transfers data for an entire volume on a corresponding mesh to the base solver; and
    wherein simulation results of the simulating simulate the airflow and heat transfer inside the modeled IT product, thereby the simulation results indicate testing of a hardware configuration of the modeled IT product corresponding to a selection of the known components to model the IT product.

2. A method according to claim 1 wherein the modeling properties for the component comprise the properties needed for simulation of the component, comprising material properties and any particular properties of the component comprising one of internal boundary conditions, thermal properties, flow rates and porosity.

3. A method according to claim 2, wherein at least one of the mesh resolution or a thickness of the surrounding air region is acquired.

4. A method in a computer system including a processor and memory of creating and solving a Computational Fluid Dynamics (CFD) model for a multi-component information technology (IT) product from a range of multi-component IT products, each IT product comprising a different combination of a plurality of components provided for the range, the method comprising:

by the processor,
  selecting a component from a component library in the memory storing known components for the range, to model an IT product,
    the component among the known components comprising a geometry of the component, a mesh comprising the component and a surrounding air region around the component, and modeling properties,
    each selected component classified as a base model, being a largest component in the IT product, and including a base component mesh which defines a size of a simulation domain, and at least one normal component model, being one of remaining components among the components in the IT product, with a higher resolution mesh within the base component mesh;
  placing the selected component in a configuration;

displaying a Graphical User Interface (GUI) which is divided into a plurality of windows to display a combination of views including a component library view of the known components, a selected component view, or a complete model view, to display the selected component and the placed selected component in the configuration:

when a plurality of selected components in the modeled IT product have been placed, creating and saving data needed for a CFD simulation as the CFD model of the modeled IT product; and routing the CFD model to a plurality of solvers executing in the computer system in parallel, thereby simulating airflow and heat transfer among the components of the CFD model, the solvers being provided based on a division of the modeled IT product into components to execute a base solver corresponding to the base model and a number of normal component solvers corresponding to the at least one normal component, wherein the base solver iterates to solve the base model and the normal component solvers iterate to solve the at least one normal component model, wherein the base solver transfers boundary conditions to each normal component solver and each normal component solver transfers data for an entire volume on a corresponding mesh to the base solver; and wherein simulation results of the simulating simulate the airflow and heat transfer inside the CFD model, thereby the simulation results indicate testing of a hardware configuration of the CFD model corresponding to a selection of the known components to create the CFD model.

5. A method according to claim 4, wherein an intersection between a newly placed or modified component in the component library and the CFD model is calculated, and an intersection rule is automatically applied.

6. A method according to claim 5, wherein an intersection rule does not allow at least one of an intersection of the solid parts of components, an intersection rule trims any air region outside the X and Y boundaries of a simulation domain and an intersection rule expands a simulation domain in the Z direction to include an air region of a component.

7. A method according to claim 1, wherein to model the IT produces includes placing known components, wherein once the known components in the modeled IT product have been placed, larger components and their surrounding regions are split using a mesh partitioning algorithm.

8. A method according to claim 1, wherein to model the IT product includes placing known components, wherein once the known components in the modeled IT product have been placed, smaller components in mutual proximity are combined into a larger component using mesh merging.

9. A method in a computer system including a processor and memory to solve a Computational Fluid Dynamics (CFD) model of a multi-component information technology (IT) product comprising a plurality of components, the method comprising:

by the processor, displaying a Graphical User Interface (GUI) to allow selection and placing of the components, including displaying the selection and placing of the components through the GUI which is divided into a plurality of windows to display a combination of views including a component library view of known components, a selected component view, or a complete model view, to display the selected component and the placed selected component in the configuration:

simulating, using a plurality of solvers executing in the computer system in parallel, airflow and heat transfer among components of a modeled IT product, the solvers being provided based on a division of the modeled IT product according to the components in the modeled IT product, wherein each component classified is as a base model, being a largest component in the modeled IT product, and including a base component mesh which defines a size of a simulation domain, and at least one normal component model, being remaining components among the components in the modeled IT product with a higher resolution mesh within the base component mesh;

scheduling a time of action of each solver among the plurality of solvers and data exchange between the plurality of solvers, the plurality of solvers are grouped into a base solver corresponding to the base model, at least one normal component solver corresponding to the at least one normal component model, and the data exchange is between the at least one normal component solver and the base solver, the base solver iterates to solve the base model and the normal component solvers iterate to solve the at least one normal component model, and the base solver transfers boundary conditions to each normal component solver and each normal component solver transfers data for an entire volume on a corresponding mesh to the base solver;

wherein simulation results of the simulating simulate the airflow and heat transfer inside the modeled IT product, thereby the simulation results indicate testing of a hardware configuration of the modeled IT product corresponding to a selection of the components to model the IT product.

10. A method according to claim 9, wherein the scheduler allows one iteration for each solver, before triggering data exchange between the solvers.

11. A method according to claim 9, wherein the scheduler is a flat scheduler which operates the solvers in parallel and allows data exchange between the solvers after one iteration or a hierarchical scheduler which groups the components and allows convergence of at least one group of solvers before data exchange takes place.

12. A method according to claim 9, wherein the base solver carries out one iteration before data exchange.

13. A computer apparatus to implement Computational Fluid Dynamics (CFD) analysis including pre-processing and processing for a range of multi-component information technology (IT) products, the computer apparatus comprising:

a processor to, obtain a Computer Aided Design (CAD) model of a geometry of a component among components for an IT product;

display a Graphical User Interface (GUI) to, add a surrounding air region around the component, create a mesh comprising the component and the surrounding air region for use in the CFD analysis, set modeling properties for the component, store in a component database information of known components for the range, and allow selection and placing of the known components, including displaying the selection and placing of the known components through the GUI which is divided into a plurality of windows to display a combination of views including a component library view of the known components, a selected component view, or a complete model view, to model IT products,
  wherein to model an IT product, a component among components in a model of a product is classified as a base model, being a largest component in the modeled IT product, and including a base component mesh which defines a size of a simulation domain, at least one normal component model, being one of remaining components among the components in the modeled IT product, with a higher resolution mesh within the base component mesh; and
execute a plurality of solvers in parallel, thereby simulating airflow and heat transfer among the components of the modeled IT product, the solvers being provided based on a division of the modeled IT product into components to execute a base solver corresponding to the base model and a number of normal component solvers corresponding to the at least one normal component,
  wherein the base solver iterates to solve the base model and the normal component solvers iterate to solve the at least one normal component model,
  wherein the base solver transfers boundary conditions to each normal component solver and each normal component solver transfers data for an entire volume on a corresponding mesh to the base solver; and
  wherein simulation results of the simulating simulate the airflow and heat transfer inside the modeled IT product, thereby the simulation results indicate testing of a hardware configuration of the modeled IT product corresponding to a selection of the known components to model the IT product.

14. A computer apparatus to implement a method of creating and solving a Computational Fluid Dynamics (CFD) model for a multi-component information technology (IT) product, the computer apparatus comprising:
  a processor to,
    select a component from a component library database storing known components for IT products, to model an IT product,
      the component among the known components comprising a geometry of the component, a mesh comprising the component and a surrounding air region around the component, and modeling properties,
      each selected component being classified as a base model, being a largest component in the IT product, and including a base component mesh which defines a size of a simulation domain, and at least one normal component, being one of remaining components among the components in the modeled IT product with a higher resolution mesh within the base component mesh;
    place the selected component in a configuration;
    displaying a Graphical User Interface (GUI) which is divided into a plurality of windows to display a combination of views including a component library view of the known components, a selected component view, or a complete model view, to display the selected component and the placed selected component in the configuration;
    when a plurality of selected components in the modeled IT product have been placed, create and save data needed for a CFD simulation as the CFD model of the modeled IT product; and
  execute a plurality of solvers in parallel, thereby simulating airflow and heat transfer among the components of the CFD model, the solvers being provided based on a division of the modeled IT product into components to execute a base solver corresponding to the base model and a number of normal component solvers corresponding to the at least one normal component,
    wherein the base solver iterates to solve the base model and the normal component solvers iterate to solve the at least one normal component model,
    wherein the base solver transfers boundary conditions to each normal component solver and each normal component solver transfers data for an entire volume on a corresponding mesh to the base solver; and
    wherein simulation results of the simulating simulate the airflow and heat transfer inside the CFD model, thereby the simulation results indicate testing of a hardware configuration of the CFD model corresponding to a selection of the known components to create the CFD model.

15. A computer apparatus solve a Computational Fluid Dynamics (CFD) model of a multi-component information technology (IT) product comprising a plurality of components, the computer apparatus comprising:
  a processor to,
    display a Graphical User Interface (GUI) to allow selection and placing of the components, including displaying the selection and placing of the components through the GUI which is divided into a plurality of windows to display a combination of views including a component library view of known components, a selected component view, or a complete model view, to display the selected component and the placed selected component in the configuration, and
    perform a CFD simulator including a scheduler and a coupler,
    wherein
      the scheduler is to manage a time of action of a plurality of solvers executing in parallel, thereby simulating airflow and heat transfer among components of a modeled IT product, the solvers being provided based on a division of the modeled IT product according to the components in the modeled IT product,
      each component classified as a base model, being a largest component in the modeled IT product, and including a base component mesh which defines a size of a simulation domain, and at least one normal component model, being remaining components among the components in the modeled IT product with a higher resolution mesh within the base component mesh;
      the scheduler controls data exchange between the solvers using the coupler, according to the time of action of each solver, and
      the solvers are grouped into a base solver corresponding to the base model, at least one normal component solver corresponding to the at least one normal component model, the data exchange is between the at least one normal component solver and the base solver, and the base solver iterates to solve the base model and the normal component solvers iterate to solve the at least one normal component model, the base solver transfers boundary conditions to each normal component solver and each normal component solver transfers data for an entire volume on a corresponding mesh to the base solver;

wherein simulation results of the simulating simulate the airflow and heat transfer inside the modeled IT product, thereby the simulation results indicate testing of a hardware configuration of the modeled IT product corresponding to a selection of the components to model the IT product.

16. A method according to claim 1, wherein each component is added once to the component library via a library user interface, accumulating expert knowledge in the component library.

17. A method according to claim 1, further including a post-processing in which the airflow and heat transfer simulation results are visualized.

18. A method according to claim 1, wherein the method is carried out by a hardware manufacturer or system integrator and includes manufacture of a tested configuration of the IT product.

* * * * *